Nov. 20, 1962 | J. DAWSON | 3,065,304

DELAY LINE PULSE STORES

Filed Feb. 10, 1961 | 8 Sheets-Sheet 1

INVENTOR
JOHN DAWSON
BY
Craig and Freudenberg
ATTORNEYS

Nov. 20, 1962 J. DAWSON 3,065,304

DELAY LINE PULSE STORES

Filed Feb. 10, 1961 8 Sheets-Sheet 2

INVENTOR

JOHN DAWSON

BY

Craig and Freudenberg

ATTORNEYS

INVENTOR
JOHN DAWSON
BY
Craig and Freudenberg
ATTORNEYS

Nov. 20, 1962 J. DAWSON 3,065,304

DELAY LINE PULSE STORES

Filed Feb. 10, 1961 8 Sheets-Sheet 4

INVENTOR

JOHN DAWSON

BY

Craig and Freudenberg

ATTORNEYS

Nov. 20, 1962 J. DAWSON 3,065,304

DELAY LINE PULSE STORES

Filed Feb. 10, 1961

8 Sheets-Sheet 5

INVENTOR

JOHN DAWSON

BY

Craig and Freudenberg

ATTORNEYS

Nov. 20, 1962 J. DAWSON 3,065,304

DELAY LINE PULSE STORES

Filed Feb. 10, 1961 8 Sheets-Sheet 6

INVENTOR
JOHN DAWSON
BY
Craig and Freudenberg
ATTORNEYS

Nov. 20, 1962

J. DAWSON 3,065,304

DELAY LINE PULSE STORES

Filed Feb. 10, 1961

8 Sheets-Sheet 7

INVENTOR
JOHN DAWSON
BY
Craig and Freudenberg
ATTORNEYS

Nov. 20, 1962 J. DAWSON 3,065,304

DELAY LINE PULSE STORES

Filed Feb. 10, 1961 8 Sheets-Sheet 8

INVENTOR
JOHN DAWSON
BY
Craig and Freudenberg
ATTORNEYS 3,065,304

DELAY LINE PULSE STORES

John Dawson, Kirkby-in-Ashfield, England, assignor to Ericsson Telephones Limited, London, England, a British company Filed Feb. 10, 1961, Ser. No. 88,450
10 Claims. (Cl. 179—15)

Figure 1:
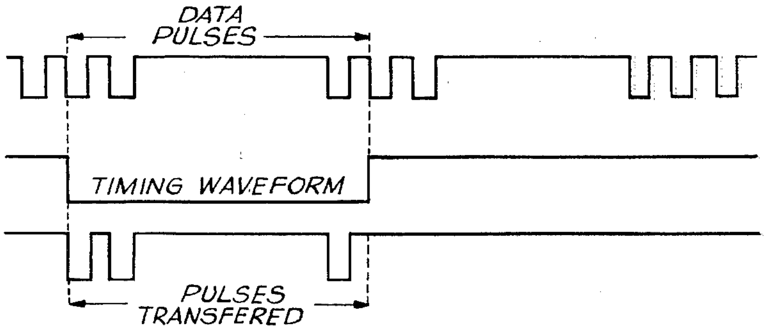

The present invention relates to cyclically operating electronic apparatus, particularly electronic telephone exchange apparatus, in which a plurality of items of recurrently pulse-coded binary information are handled in time division multiplex, being stored in recirculating delay lines, the input to which and the output from which are controlled by means of gates. Such apparatus will hereinafter be referred to as of the kind specified.

As is well known, in such apparatus the total period T of each complete cycle is divided into a plurality N of successive time slots $t_1$ to $t_n$ of equal duration $t=T/N$. N is the number of items of information, which may be represented as $x_1$ to $x_n$. Each item of information is of content one binary digit only and thus, if $x_i=1$, a pulse (of duration somewhat less than $t$) appears in each successive time slot $t_i$ until such time as $x_i$ changes to 0 when pulses are absent from the time slots $t_i$.

A recirculating delay line comprises an input circuit through which pulses may be launched in a delay line, an output circuit in which pulses appear after traversing the delay line and a feedback connection from the output to the input circuit including a pulse reshaping circuit and an inhibitory gate by means of which feedback may be prevented. The recirculating period of the delay line must be T (or, though this is not usual in practice, an integral multiple of T). So long as the delay line is undisturbed, the information content in the case of each time slot is preserved through each successive cycle of operation. The information content of any time slot may be changed by the application of a pulse to the input circuit at the appropriate time within one cycle of operation or by operaton of the inhibitory gate at the appropriate time within one cycle of operation.

The control of apparatus of the kind specified involves the use of a variety of waveforms. These include short pulses ($<t$) of periodicity T which identify the different time slots and hence the different items of information. The present invention is concerned with other waveforms, which will be called timing waveforms, which are used to control the gating of the information in all N time slots into or out of a recirculating delay line.

The obvious shape for a timing waveform is a long pulse of duration T having rise and fall times short compared with $t$ and the leading and trailing edges of which are timed to occur between the pulses in two consecutive time slots. In practice the generation of such a pulse may require expensive apparatus since T may be of the order of 1 millisecond and $t$ of the order of 1 microsecond. It is not satisfactory merely to allow the leading and trailing edges of the pulses to rise and fall more slowly since this allows reduced amplitude pulses to pass through gates to which the timing waveform is applied. As explained more fully hereinafter, these reduced amplitude pulses can interfere seriously with the operation of the apparatus.

It is an object of the present invention to overcome these problems in an expedient manner.

According to the present invention apparatus of the kind specified is characterised by an asynchronous waveform generator adapted to generate timing waveforms for application to selected gates and being in the form of timing pulses of duration exceeding T, the period of each complete cycle of operation, and having rise times exceeding $t=T/N$ where N is the number of time slots into which T is divided and a synchronous inhibit waveform generator adapted to generate and apply, at the beginning of each timing pulse and to all critical gates to which timing pulses may be applied, an inhibit pulse whose trailing edge is arranged to occur after the timing pulse has reached sufficient amplitude and at least an interval T before the timing pulse amplitude subsequently falls below sufficient amplitude and is synchronised to lie substantially wholly between pulses pertaining to successive time slots.

By "critical gates" are meant gates, the operation of which to pass intermediate amplitude pulses would be liable to cause one or more items of information to be lost. The amplitude of the timing pulse referred to as sufficient means that amplitude at which and above which all critical gates pass only pulses of sufficient amplitude for no items of information to be lost.

The said pulses pertaining to successive time slots may be data pulses. It is much preferred however that these pulses be strobe pulses of duration short compared with $t$ and used to control the initiation of data pulses in the formation or reshaping of the latter. It is then more simple to place the trailing edge of the inhibit pulse between successive pulses.

Figure 2:
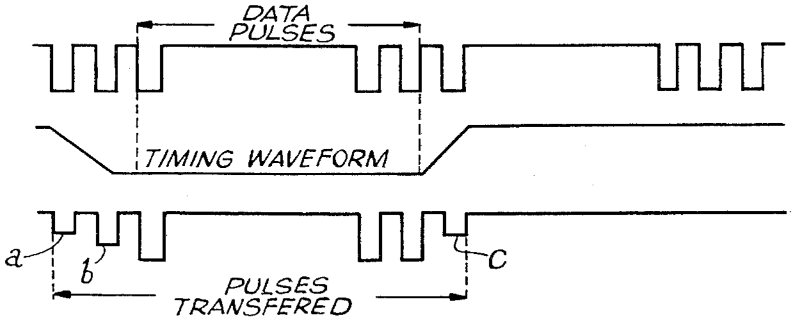
Figure 3:
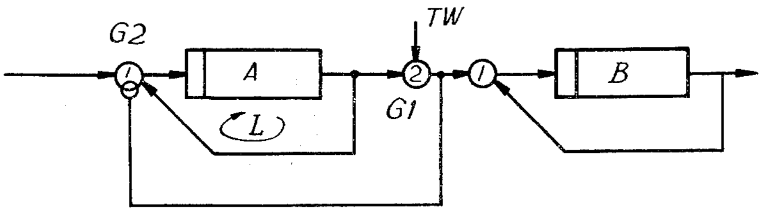
Figure 4:
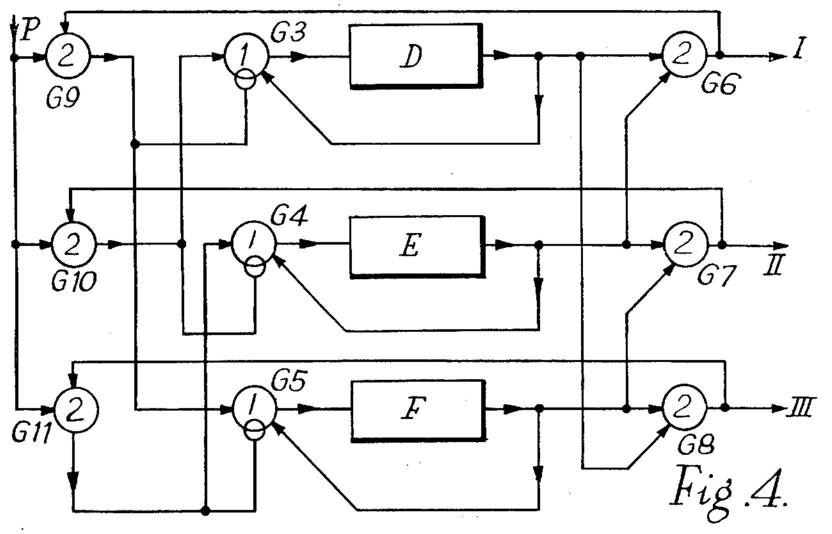
Figure 5:
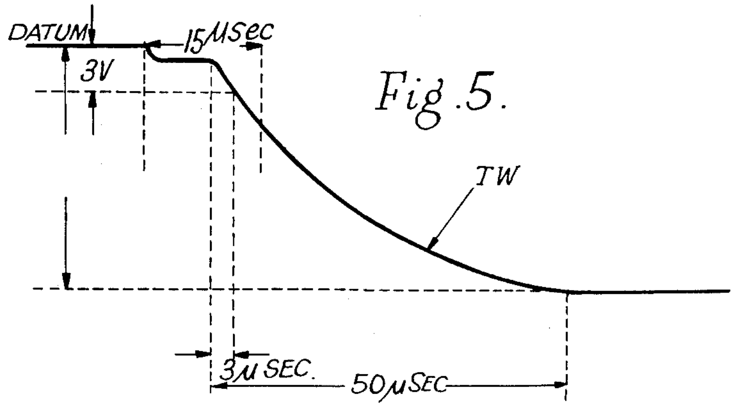
Figure 6:
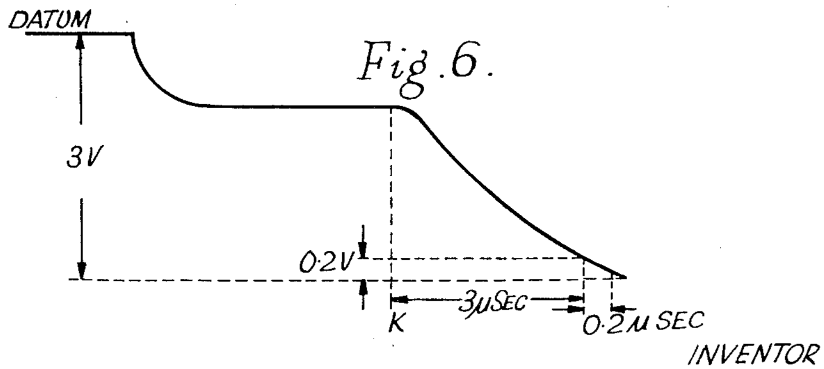
Figure 7:
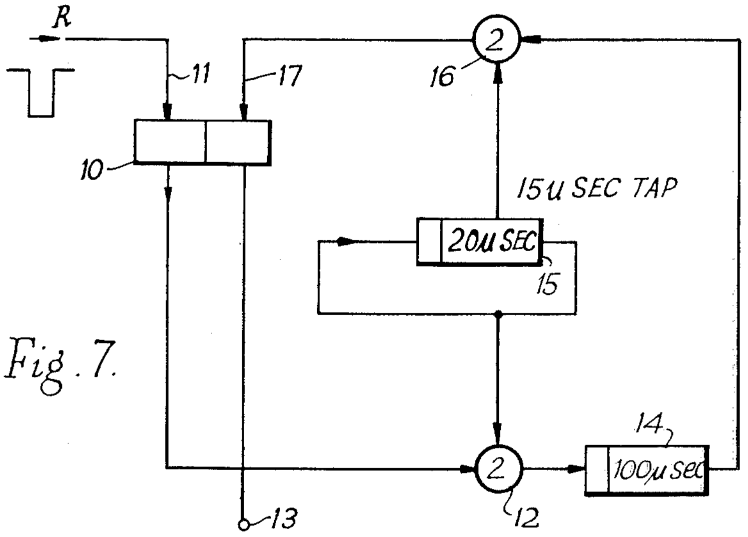
Figure 8:
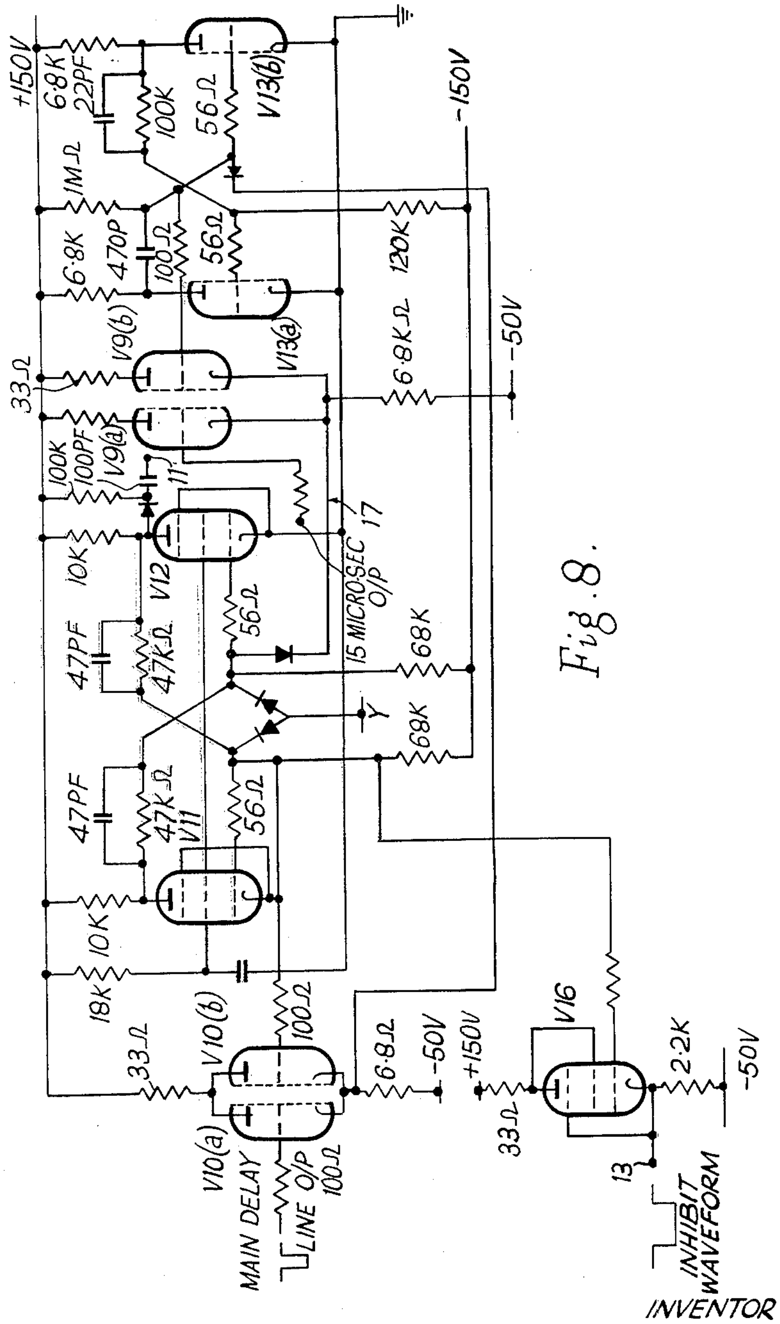
Figure 9:
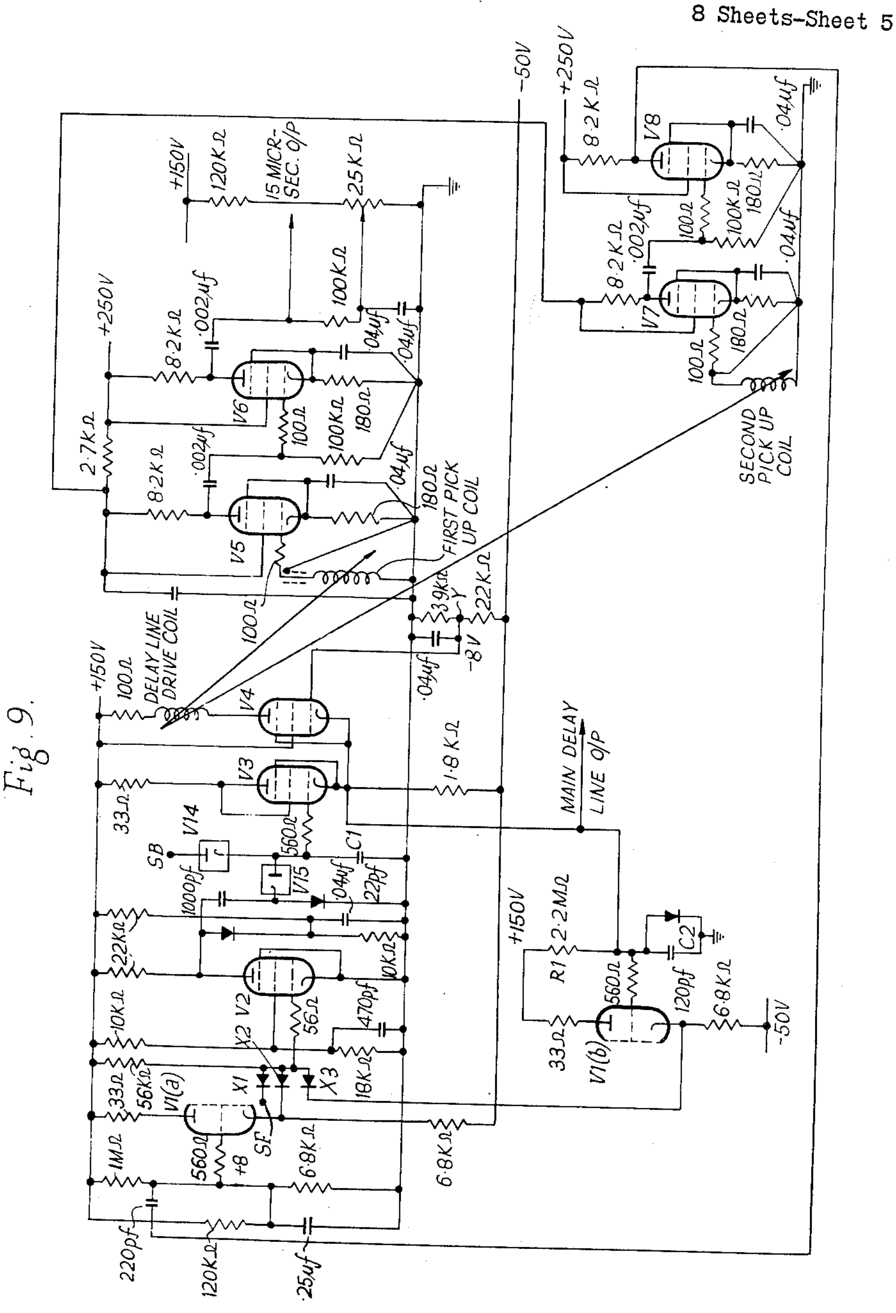
Figures 10, 11:
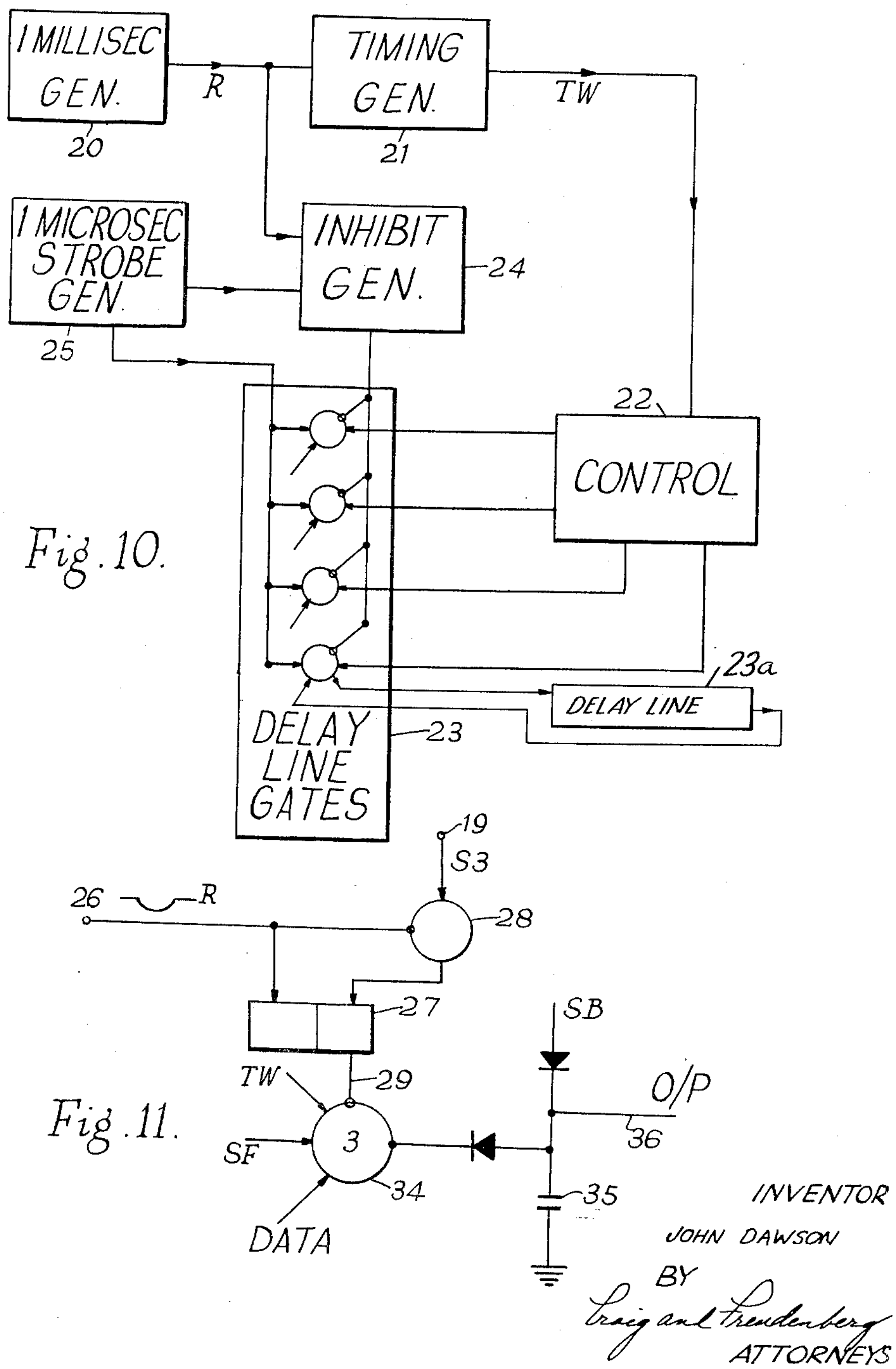

The invention will now be described in greater detail, by way of example with reference to the accompanying drawings. In the drawings:

FIGS. 1 and 2 are diagrams illustrating the transfer of pulse-coded information in apparatus of the kind specified, FIGS. 3 and 4 are block diagrams of two circuits which may operate wholly incorrectly when reduced amplitude pulses are applied thereto, FIG. 5 is a diagram of the leading edge of a timing pulse, used in estimating the probability that incorrect operation of circuits 3 and 4 will occur, FIG. 6 shows a portion of FIG. 5 to an enlarged scale, FIG. 7 is a block diagram of an inhibit waveform generator for use in practising the present invention, FIGS. 8 and 9 together form a circuit diagram of the generator of FIG. 7, FIG. 10 is a block diagram of a complete embodiment of the invention.

Figure 12:
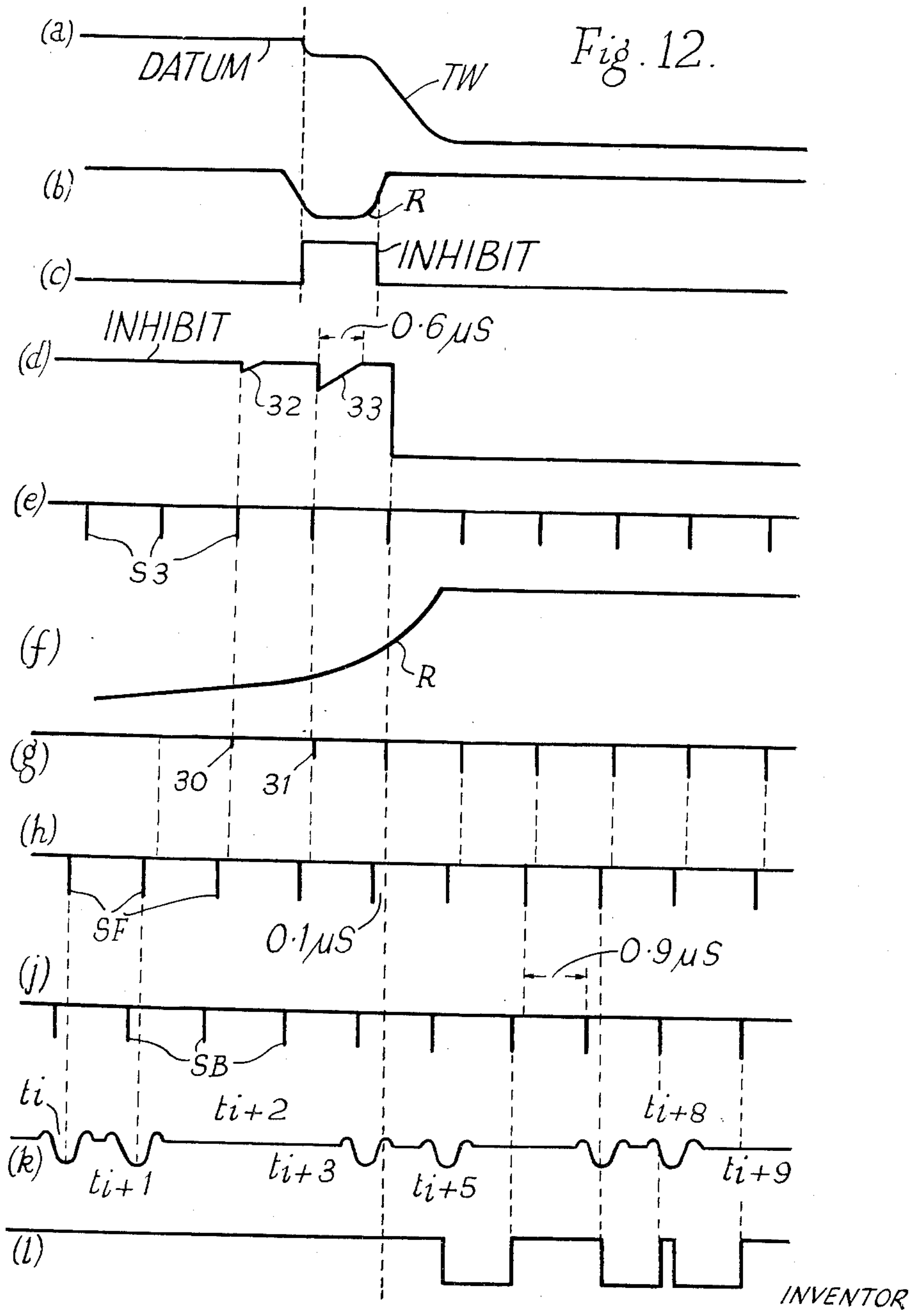
Figure 13:
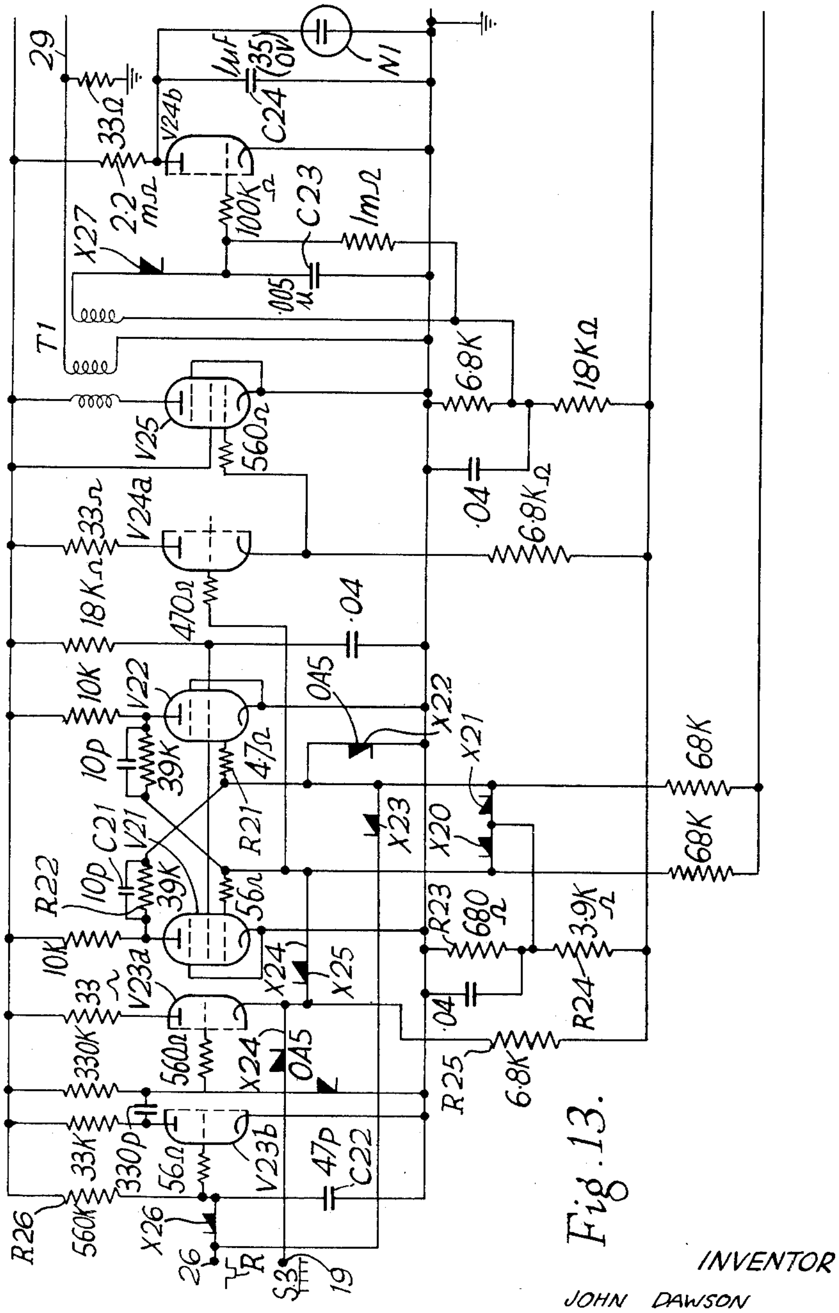

FIG. 11 is a block diagram of another inhibit waveform generator for use in practising the invention, FIG. 12 is a further explanatory diagram, and FIG. 13 is a circuit diagram of the generator of FIG. 11.

In apparatus of the kind specified it is desirable, when the pulses in one period T are to be gated into or out of a recirculating delay line, that only the particular pulses concerned are operated on.

The theoretically ideal method of ensuring this is to provide a timing waveform which is synchronous with the pulses concerned and whose leading and trailing edges have relatively short rise and fall times respectively. This type of timing waveform is illustrated in FIG. 1 of the drawings. In practise the provision of such a waveform presents considerable difficulties and the apparatus required may be complex and expensive. This is because the timing waveform is of considerable duration, say 900 μs. but would need to have a very short rise time, say less than ½ μs. A second method which may be used is to provide a timing waveform of sufficient duration to overlap the period in which the pulses concerned occur. If, in apparatus of the kind specified, a timing waveform overlaps a pulse repetition period T, no problems arise providing that the additional pulses reproduced are not substantially reduced in amplitude, but should the timing waveforms have a relatively long rise and fall time the additional pulses produced may be of reduced amplitude and various problems are created. A timing waveform of this type is illustrated in FIG. 2, transferred pulses of reduced amplitude being shown at *a*, *b* and *c*. With this second method the apparatus must be designed to deal with these amplitude-distorted pulses which occur. The provision of apparatus to deal with these distorted pulses may be both difficult and expensive.

One of the problems which this second method creates will be described with reference to FIG. 3 of the drawings. In this, and other figures, the pulse-reshaping circuits associated with recirculating delay lines have been omitted. Information stored in a delay device, A, normally circulating around a loop L including an inhibit gate G2, is required to be transferred to a delay device B and to be erased from the delay device A when transfer takes place. The transfer of the information is brought about by the application of a timing waveform TW to a gate G1 between A and B and having its output connected to the input of B and to the inhibitory input of G2. If the leading edge of the timing waveform TW causes a distorted pulse to be produced by the gate G1, the distorted pulse may not be of sufficient amplitude to write in the delay line B but may succeed in erasing the information in the delay device A by inhibiting the gate G2. Thus the information is lost.

Another difficulty which may occur when pulses of intermediate amplitude are generated will be described with reference to FIG. 4. This shows in simplified form a logical circuit such as may be used in electronic telephone exchanges and comprising three delay lines D, E and F having their outputs connected to their inputs through inhibit gates G3, G4 and G5 respectively. Normally pulses are circulating in two stores, a code I being represented by pulses in D and E, a code II by pulses in E and F and a code III by pulses in F and D. Appropriately connected 2-gates G6, G7 and G8 select these outputs. When it is necessary to change from code I to code II, from code II to code III or from code III to code I an input pulse is applied at P to three 2-gates G9, G10 and G11 having second inputs connected respectively to the outputs I, II and III. If the code stored is I, a pulse at P opens G9, the output of which is applied firstly to inhibit the gate G3 and hence arrest the pulse in D and secondly to G5 to launch a pulse in F. Thus the code changes to II. The next pulse at P opens G10 and changes the code to III and the third pulse at P opens G11 and changes the code back to I.

If a pulse applied at P is not of full amplitude a pulse of reduced amplitude may be produced at the output of G9, G10 or G11. Taking G9 for example, this pulse of reduced amplitude may be of sufficient amplitude to inhibit G3 and hence erase D but of insufficient amplitude to write in F. The device is then rendered inoperative since no 2-gate G6, G7 or G8 will open and hence no gate G9, G10 or G11 can be opened by subsequent pulses at P.

An equally disastrous situation will occur, if alternatively, the pulse is of insufficient amplitude to inhibit G3 and hence erase D but of sufficient amplitude to write in F since all stores will be filled, all gates G6, G7 and G8 will be open and the device will be momentarily placed in a state in which all codes appear simultaneously. The next pulse applied at P will erase all three delay lines, in which state the device will be locked. These difficulties arise because it is not possible to make the amplitudes at which the different gates respond exactly the same.

Consider now an arrangement in which information is represented by pulses of, say, ½ microsecond duration interlaced on a time division basis, each time slot being of duration 1 microsecond and being repeated every 900 microseconds. ($T$=900 microseconds, $N$=900, $t$=1 microsecond). In one such arrangement it has been found in practice that a pulse greater than 3 volts in amplitude is necessary to write a pulse in a delay device whilst a pulse greater than 2.8 volts in amplitude will erase a pulse from a delay device. FIG. 5 of the drawings shows the leading edge of a typical negative-going timing waveform TW of the type shown in FIG. 2. From this we may compute the probability of producing an output pulse of less than 3 volts in amplitude but greater than 2.8 volts in amplitude when the timing waveform is gated with a data pulse. If an output pulse is produced whose amplitude is within these latter limits it will fail to write a pulse in a delay device but will erase a pulse in a delay device. It will be seen from FIG. 6 of the drawings, which shows part of the waveform TW on a larger scale, that the trailing edge of an information pulse would have to coincide with a portion of the timing waveform which is only 0.2 microsecond in duration in order to produce an output pulse of such intermediate amplitude. If we assume that the information pulse and the timing waveform have a random time distribution the probability of the required conditions being satisfied is of the order of 900/0.2:1=4500:1 for the particular timing waveform shown. Similarly if we consider the probability of the required conditions being satisfied by a distorted pulse as described with reference to FIG. 4 it will be seen to be of the order of 900:1. These calculations are purely by way of example, but show clearly that a real risk exists that information may be irrevocably lost, or logical circuits be thrown into meaningless states. Such occurrences could not be tolerated in electronic telephone exchange equipment.

In accordance with the invention an inhibit waveform generator can be used to solve the problems created by the type of timing waveform shown in FIG. 2 without the use of a great deal of additional apparatus. The waveform generator provides an additional inhibit waveform which is applied to all the gates concerned in the writing or erasing of information in the delay lines. Using the example quoted above this waveform must prevent the transmission of information during the initial fall of the timing waveform until its amplitude exceeds 3 volts. When the inhibit waveform is removed it must allow all subsequent information pulses to pass without causing any amplitude distortion. Thus the inhibit waveform must inhibit the gate to which it is applied within approximately 1 microsecond of the commencement of the timing waveform and must be removed (in this particular case) not less than 15 microseconds later when the timing waveform has fallen by well over 3 volts (see FIG. 5) and not more than 35 microseconds later. A longer delay would shorten the effective duration of the timing waveform too much. The trailing edge of the inhibit waveform must have a fall time much shorter than 1 microsecond, and occur between successive 1 microsecond pulses.

In FIG. 7 a pulse R which occurs every millisecond and controls the initiation of timing waveforms TW throughout the apparatus of an electronic telephone exchange is applied to one input terminal 11 of a bi-stable device 10. The pulse R sets the device 10 from a datum state to an alternative state in which one output is applied to a 2-gate 12 and another output, constituting the inhibiting waveform appears at a terminal 13.

A chain of events is necessary before the device 10 is reset and the first of these is the opening of the gate 12 to set a monostable device 14 to an alternative state which is of duration 100 microseconds.

The 2-gate 12 cannot open until an output pulse from a delay-line 15 is applied thereto. The delay-line 15 has its output connected to its input and accordingly forms a recirculating delay line and, as the delay time of the line 15 is 20 microseconds, the gate 12 will open at a time somewhere between 0 and 20 microseconds after receipt of the pulse R, depending upon when the pulse was launched in the line.

A further 2-gate 16 has one input connected to the output of the monostable device 14 and another to a 15 microsecond tap on the delay-line 15. The gate 16 only opens when the device 14 is in its alternative state and also on receipt of a pulse from the delay line 15 and hence opens between 15 and 35 microseconds after the arrival of the pulse R and the initiation of the inhibiting waveform. The output from the gate 16 is applied to a second input terminal 17 of the bistable device 10 and returns the device 10 to its datum state, hence terminating the inhibit waveform.

The bi-stable device 10 is designed so as to be very fast-acting and hence the end of the inhibit waveform is sharp. The instant at which the inhibit waveform ceases is clearly determined by the instant at which the pulse is launched in the delay-line 15. This is controlled by strobe pulses used throughout the apparatus in reshaping the time-sharing data pulses and hence any required synchronism between the instant at which the inhibit waveform is terminated and the positions of the time-sharing pulses is readily achieved and it is arranged that the instant of termination lies between successive pulse positions.

It will be appreciated that by using this inhibit waveform in conjunction with a timing waveform the effect of a timing waveform with a sharp edge occurring accurately between successively pulse positions is achieved. To do this directly by appropriate design of the timing waveform generator, which has to generate a timing waveform of a millisecond duration, would be considerably more expensive.

As described the inhibit waveform generator does not give a waveform ending at a point in time specified with regard to the 1 millisecond repetition period or the time slots, but this is of no importance in the particular instance considered where, so long as the pulses within a complete millisecond period or more are transferred or otherwise operated upon, the apparatus functions properly. Moreover it is not in general necessary for the shape of the trailing edge of the timing waveform to be carefully controlled but, if necessary, a second inhibit waveform generator could be used to clean up the end of the timing waveform.

A practical embodiment of the circuit shown in FIG. 7 is shown in FIGS. 8 and 9. These will not be described in detail as the circuit diagrams are complete, including all component values. The general functioning of the circuit will however be considered below.

In FIG. 8 the bi-stable device 10 comprises pentodes V11 and V12 with a cathode follower output stage including a pentode V16. The terminal 11 to which the pulses R are applied is shown connected to the anode of V12. The output terminal 13 (FIGS. 7 and 8) at which the inhibit waveform appears is connected to the cathode of V16, the control grid of which is connected to the control grid of V11.

The output to the gating device 12 (FIG. 7) is also taken from the grid of V11 which is connected to the grid of a triode V10(*b*) which together with a triode V10(*a*) makes up the 2-gate 12. It should be noted that the bias potential for the control grids of V11 and V12 at the point Y in FIG. 8 is derived from the point Y in FIG. 9.

The other input to the 2-gate 12 is to the grid of V10(*a*). Thus a terminal connected to this grid is labelled Main Delay Line O/P and is connected to the similarly labelled terminal in FIG. 9 which shows the delay line 15 and immediately associated circuits.

The output from the 2-gate 12 is taken from the cathodes of V10(*a*) and V10(*b*) and applied to the grid of a triode V13(*b*) which together with a triode V13(*a*) constitutes the monostable device 14 of FIG. 7. The output of this latter device is taken from the same grid and applied to the grid of a triode V9(*b*).

The triode V9(*b*) and a triode V9(*a*) make up the 2-gate 16 of FIG. 7, the other input to which is to the grid of V9(*a*). This is labelled 15 Micro-Sec. O/P being connected to a similarly labelled output of the delay-line circuit in FIG. 9. The output of the 2-gate 16 is taken from the cathodes of V9(*a*) and V9(*b*) which accordingly constitute the terminal 17 of FIG. 7 and are connected to the control grid of V12 of the bi-stable device 10.

Turning now to FIG. 9 valves V1(*a*), V1(*b*), V2, V3 and V4 together make up a cricuit for launching a pulse in a magnetostrictive nickel wire delay line by way of a delay line drive coil in the anode circuit of V4. A first pick-up coil, spaced along the wire by such a distance as to pick up a pulse 15 microseconds after launching, is connected in the input circuit of a pulse amplifier comprising pentodes V5 and V6. The 15 microsecond output designated in the drawing by "15 Micro-Sec. O/P." is connected to the anode of V6. A second pick-up coil, spaced along the wire by such a distance as to pick up a pulse 20 microseconds after launching, is connected in the input circuit of a second pulse amplifier comprising pentodes V7 and V8. A 20 microsecond output is taken from the anode of V8 and connected to the input circuit of the valve V1(*a*) to complete the recirculating loop for the pulses. The main delay line output for application to the 2-gate 12 (triodes V10(*a*) and V10(*b*)) is not taken from this point however but, as shown, from the cathode of V3. It will be understood of course that the pulses in all valves V1(*a*), V1(*b*), V2, V3, V4, V7 and V8 are substantially coincident.

The manner in which a pulse is initially launched in the delay line will now be described. Three rectifiers X1, X2, and X3 with their anodes connected to the control grid of V2 form an and gate. The cathode of X1 is connected to a terminal SF to which one tenth microsecond "front strobe" pulses, occurring at a rate of 900 every millisecond and used throughout the exchange to form the front edge of reshaped time-sharing data pulses, are applied. The cathode of X2 is connected to the cathode of V1(*a*) which is at a positive potential when the circuit is switched on. The cathode of X3 is connected to the cathode of V1(*b*) which is at earth potential when the circuit is switched on. Hence the first "front strobe" pulse received opens the and gate and a positive pulse is applied to the grid of V2. V2 conducts and charges a capacitor V1 negatively by way of a diode valve V15.

A fraction of one microsecond after each "front strobe" pulse a positive-going "back strobe" pulse is applied to a terminal SB connected to the capacitor C1 through a diode valve V14. The "back strobe" pulse following the "front strobe" pulse which opened the gate made up by X1, X2 and X3 discharges the capacitor C1 and hence an accurately timed and shaped negative-going pulse appears across C1. This is applied to V3 which acts as a cathode follower. The negative pulse appearing at the cathode of V3 is applied firstly to the cathode of V4 to render V4 conducting and hence to pass a current pulse through the delay line drive coil in the anode circuit of V4. The pulse is applied secondly to a capacitor C2 in the grid circuit of the valve V1(*b*) and thirdly as the main delay line output to the 2-gate 12. The capacitor C2 requires a negative charge which depresses the cathode potential of V1(*b*) to an extent such that subsequent "front strobe" pulses applied to SF do not open the and gate X1, X2, X3 until the charge has leaked away sufficiently through a 2.2 MΩ resistor R1.

The rate of discharge is such that the capacitor C2 has lost its negative charge after about 15 microseconds. A second pulse is then launched down the delay line. After a further time period of about five microseconds the first pulse is received at the second pick up coil and amplified to produce the 20 microsecond output pulse appearing in the positive sense. This is applied to the grid of V1(*b*) where D.C. restoration takes place and the no signal level at this point becomes negative. This pulse cannot pass through the and gate X1, X2, X3 as X3 is negative at this time. Subsequently when X3 returns to earth level no pulse will be launched because X2 will then be negative.

Thus matters are so arranged that, not until the strobe pulse coincident with the next 20 microsecond output pulse appearing in a positive sense at the cathode of V1(*a*) appears will the gate X1, X2, X3 open to launch a further pulse down the delay line.

It will be understood that the 20 microsecond delay line with a 15 microsecond tap can be replaced by a 20 microsecond delay device and a 15 microsecond delay device driven in parallel from the output of the 20 microsecond delay device.

The monostable device 14 (FIG. 7) must stay in its unstable state at least 15 microseconds in order that the gate 16 may be open when the next pulse from the 15 microsecond tap appears. As described a period of 100 microseconds for the unstable state is used, giving a large margin of safety. The monostable device 14 could be replaced by a second bi-stable device arranged to be set to an alternative state, in which the gate 16 is conditioned to open, by an output pulse from the gate 12 and to be reset to a datum state, in which the gate 16 is not conditioned to open, by the bi-stable device 10 when the device 10 returns to its datum state.

Although the foregoing description concerns negative-going pulses and waveforms it will be appreciated that the invention may be adapted to suit apparatus in which positive-going pulses and waveforms are employed.

The overall operation of apparatus according to the invention will be further considered with reference to FIG. 10. This shows a generator 20 which generates a 25 microsecond pulse R every millisecond. This pulse has a long rise time (of the order of 5 microseconds) and a maximum amplitude of 25 volts. The pulse R is used to operate a timing waveform generator 21 which produces the millisecond timing pulses TW which have poor front edges (FIG. 5) and clearly cannot be said to start at any well defined time.

In general successive pulses TW appear in different, non-time-sharing channels but this is not of importance to understanding the present invention. The pulses TW are routed by a control circuit 22 (in response to general supervisory information supplied to the control circuit), and are thus applied to selected gates 23, of which only four are shown by way of illustration, to control the input to and output from selected recirculating delay lines. By way of illustration, the lowermost gate 23 is shown controlling the recirculation of pulses in a delay line **23*a***.

The pulses R are also applied to the inhibit waveform generator 24, which may be as previously described with reference to FIG. 7 or as subsequently described with reference to FIG. 11. An inhibit pulse is initiated by each pulse R. On account of the use of a fast-acting bistable circuit in the inhibit waveform generator the inhibit pulses have fast leading and trailing edges (though a slow leading edge could obviously be tolerated). Because the bistable circuit is triggered on by a slow-rising pulse R the leading edge of the inhibit pulse does not occur at any determinate instance of time. The generator 20 is in any case asynchronous with the generator which supplies strobe pulses used in pulse reshaping and hence in determining the time slots.

This latter generator is shown at 25 and feeds strobe pulses to the gates 23. In addition strobe pulses are fed to the generator 24 and control precisely the instant at which the trailing edge of the inhibit pulse occurs (as already described in the case of the embodiment of FIG. 7). It will be appreciated that it may well be desirable to apply to the generator 23 strobe pulses which, though necessarily synchronous with, do not occur simultaneously with either the pulses SF or the pulses SB, used to determine the leading and trailing edges respectively of the reshaped data pulses. This will be determined by the necessity of placing the trailing edge of the inhibit pulse between pulses pertaining to successive time slots. An example of this will be found in the generator to be described with reference to FIGS. 11 and 13.

It will be recalled that the time slots are of duration 1 microsecond. In some parts of the apparatus the data pulses may only be of 0.5 microsecond duration but elsewhere the duration may be as much as 0.9 microsecond. This longer duration is used because, in passing the pulses through gates, the sharp leading edge is smoothed off into a curve and only the latter part of the pulse is left of proper amplitude. More of this "smoothing off" can take place with a pulse of 0.9 microsecond than with a pulse of 0.5 microsecond before the pulse contains no part of sufficient amplitude. Hence the longer pulses may be used, in spite of the fact that the gap between consecutive pulses becomes extremely small —0.1 microsecond. Nevertheless, this makes the problem of placing the trailing edge of the inhibit pulse between consecutive data pulses extremely difficult.

It is therefore preferred to apply the inhibit pulse in conjunction with the SF pulses which strobe the leading edges of the data pulses. It is then only necessary to place the trailing edge of the inhibit pulse in a gap between consecutive SF pulses which are of duration only 0.1 microsecond, the gaps being 0.9 microsecond.

These matters will be further considered in relation to the circuit shown in FIGS. 11 and 13. Referring then to FIG. 11, the pulse R is applied to a terminal 26 connected to a fast-acting bistable circuit 27 and to the inhibitory input of an inhibit gate 28. The bistable circuit triggers from its datum state to its alternative state and the inhibit pulse is initiated, appearing on an output 29.

Strobe pulses S3 occurring 0.9 microsecond before the strobe pulses SF are applied by way of a terminal 19 through the gate 28 to reset the circuit 27 and terminate the inhibit pulse. Reset must of course be delayed until the timing waveform, also initiated by the pulse R, has reached sufficient amplitude. This is effected by using the 25 microsecond pulse R to inhibit the gate 28.

On account of the slow trailing edge of the pulse R the gate 28 will, before passing a full-amplitude pulse S3, pass a small number of reduced amplitude pulses. The bistable circuit 27 is made sufficiently fast-acting however to ensure that, under such circumstances, the circuit will either have reset completely by the time the next pulse SF occurs (0.9 microsecond after the pulse S3), or will have returned to the set condition before the next pulse SF occurs. It is arranged in fact that the circuit 27 when partially, but not completely, triggered by a pulse S3 of reduced amplitude, returns to its set state within 0.8 microsecond.

Reference is now made to the explanatory waveforms shown in FIG. 12. In this the start of a timing waveform TW is shown at (*a*) together with the pulse R(*b*) which initiated TW. (*c*) shows the inhibit waveform produced in response to the pulse R. (*d*) shows the end of the inhibit waveform to larger time scale together with the strobe pulses S3(*e*), the end of the reset waveform R(*f*) and the strobe pulses (*g*) as passed by the gate 28 (FIG. 11). Reduced amplitude pulses are indicated at 30 and 31 and the resulting disturbances in the inhibit waveforms (*d*) are indicated at 32 and 33. The duration of these disturbances never exceeds 0.8 microsecond and they must therefore be over before the ensuing one of the strobe pulses SF shown at (*h*). The strobe pulses SB are shown at (*j*) and data pulses present in some of the time slots $t_1$, $t_{1+1}$ . . . are shown at (*k*). The data pulses are shown as they appear after transmission through a magnetostrictive delay line. By fine adjustment of the output tapping points of the delay lines it is ensured that the peaks of such data pulses coincide with the strobe pulses SF. In practice this means that a delay time of fractionally under 900 microseconds is employed.

The use of the waveform (*d*) in conjunction with the waveform TW, the strobe pulses (*h*) and (*j*) and the data pulses (*k*) is illustrated in FIG. 11. A three gate 34 requires the simultaneous application a timing waveform TW and a data pulse with a strobe pulse SF. Even then so long as an inhibit pulse is present on the lead 29 the gate is inhibited. When a strobe pulse SF passes the gate 34 a capacitor 35 is charged negatively and is subsequently discharged by the next pulse SB. Accordingly a shaped data pulse of 0.9 microsecond duration appears at the output 36 which is used to launch a pulse in a delay line. The shaped data pulses appearing in response to the data pulses (*k*) in FIG. 12 are shown at (*l*).

The inhibit waveform generator of FIG. 11 is shown in detail in FIG. 13. Valves V21 and V22 with their associated components form the bistable circuit 27 of FIG. 11. The feedback chains and anode leads are of low impedance in order to allow the grid and anode capacitances to be charged quickly. Each feedback chain consists of series connected resistors R21 and R22 and a "speed-up" capacitor C21 shunting the resistor R22. It is arranged that the capacitor C21 and grid capacitance together form a potential divider the impedance ratio of which is the same as that of R22 and R21. This gives the circuit maximum switching speed and minimum "dead time." As a further aid to increased switching speed the grids of valves V21 and V22 are not allowed to fall below —7.5 volts, being returned to the junction of R23 and R24 through diodes X20 and X21.

The inhibit pulse occurs every millisecond but is only about 30 microseconds long. The valve V22 is therefore on for about 97% of the time. In order to avoid damage to the valve by grid current flow a diode X22 catches the grid of V22 at earth.

The reset waveform R is applied to the grid of V22 from terminal 26 via a diode X23.

The inhibit gate 28 is formed by a triode **V23*a* with a cathode load R25. The strobe pulses S3 from terminal 19 are applied to the cathode of V23*a* by way of a diode X24 and the cathode of V23*a* is connected to the grid of V21 through a diode X25. The inhibit to V23*a* is actually determined by the ordinary bias on the grid. A pulse to remove inhibition is derived by inversion of the reset waveform R in V23*b*** and subsequent differentiation.

So long as R is applied to V22 there is a tendency for the bistable circuit to remain set. The pulse R is therefore lengthened before application to **V23*b* by a network comprising R26, X26 and C22. Inhibition of V23*a* therefore continues slightly after the end of application of R to V22. When the lengthened pulse R ceases the anode potential of V23*b* rises. This rise of potential is differentiated by the A.C. coupling between the anode of V23*b* and the grid of V23*a* and the relatively short pulse thereby applied to the grid of V23*a* opens the gate formed by V23*a*, R25 and the diode X24. X24 must have low forward impedance in order to hold the gate when V23*a*** is cut off.

The output from the bistable circuit is taken from the grid of V21 and is buffered in a cathode follower **V24*a*. The inhibit pulses are then applied to a valve V25 having the primary of a pulse transformer T1 as its anode load. The output line 29 is connected to one of two secondaries. Normally a 30 microsecond pulse occurs every millisecond in both secondaries. In the event of any failure a circuit connected to the other secondary provides a warning. Thus the pulses occurring in the other secondary are rectified by a diode X27 and charge a capacitor C23 sufficiently to hold V24*b* conducting. A neon indicator N1 in parallel with V24*b* and a capacitor C24 is therefore normally prevented from striking. If the pulses fail C23 discharges, V24*b* is cut off and N1 strikes but, because of C24**, flashes on and off. The neon indicator is actually at a remote position.

In the circuit V23 and V24 are type 5965. V21, V22 and V25 are type CV4055.

I claim:

1. Cyclically operating electronic apparatus for handling a plurality of items of recurrently pulse-coded binary data-pulse information in time division multiplex, each complete cycle of operation being of period T and divided into N time slots of duration $t=T/N$ for N items respectively of information, the apparatus comprising recirculating delay line for storing said items of information and controlling gates operatively coupled to the delay lines for controlling the input of information to and the output of information from said delay lines, the apparatus further comprising an asynchronous waveform generator for generating timing pulses of duration exceeding T and rise times exceeding *t*, a control for causing the timing pulses to be applied to selected ones of said gates, a synchronous inhibit waveform generator adapted to generate at the beginning of each timing waveform an inhibit pulse having a fall time small compared with *t*, means for coupling the inhibit pulses to all critical gates of the aforesaid gates, means for preventing the termination of an inhibit pulse before an instant at least late enough for its coeval timing pulse to reach a predetermined sufficient amplitude, said instant being at least an interval T before said timing pulse subsequently falls below said sufficient amplitude, and synchronising means controlling the inhibit waveform generator to course the precise instant of termination of the inhibit pulse to be such that the falling edge of said pulse lies substantially wholly between pulses of periodicity *t* and pertaining to successive time slots.

2. Apparatus according to claim 1, comprising a strobe pulse generator for generating front strobe pulses defining the leading edges of data pulses and which constitute the aforesaid pulses pertaining to successive time slots.

3. Apparatus according to claim 2, wherein said strobe pulse generator generates further strobe pulses synchronous with but retarded in phase with respect to said front strobe pulses and comprising means introducing said further strobe pulses into said inhibit waveform generator to trigger the cessation of each inhibit pulse.

4. Apparatus according to claim 3, wherein said inhibit waveform generator comprises a fast-acting bistable circuit, means for setting said bistable circuit to its alternative state at the beginning of each timing pulse and means for resetting said bistable circuit to its datum state by means of one of said further strobe pulses after an elapse of time.

5. Apparatus according to claim 4, comprising a source of control pulses for initiating timing pulses and wherein said control pulses are also applied to said inhibit waveform generator to initiate said inhibit pulses by setting said bistable circuit.

6. Apparatus according to claim 5, comprising means for preventing the resetting of said bistable circuit by a stobe pulse until the end of the control pulse setting said bistable circuit.

7. Apparatus according to claim 6, wherein said preventing means comprise a differentiating circuit for differentiating said control pulses and a gating circuit coupled to said strobe pulse generator and to said differentiating circuit to pass strobe pulses only when gated with a pulse produced by differentiation of the trailing edge of a control pulse.

8. Apparatus according to claim 7, further comprising means for lengthening said control pulses for application to said differentiating circuit.

9. Apparatus according to claim 1, wherein said inhibit waveform generator comprises a bistable device, means for setting said bistable device to its alternative state, an output terminal of said device at which said timing pulse appears so long as said device is in its alternative state, and a reset circuit for said bistable device, said reset circuit comprising a recirculating delay line element having first and second outputs, first and second gates coupled to said outputs respectively, a further two-state device coupled between the first and second gates an input connection from said bistable device to said first gate and an output connection from said second gate to said bistable device said first gate being opened by a pulse appearing at said first delay line element output only when said bistable device is in said alternative state and, when so opened, setting said further two-state device to its alternative state, said second gate being opened by a pulse appearing at said second delay line element output only when said further two-state device is in its alternative state and, when so opened, resetting said bistable device to its datum state.

10. Apparatus according to claim 9, wherein said further two-state device is a monostable device adapted to remain in its alternative unstable state for a period longer than the interval separating the appearance of pulses in succession at said first and second delay line element outputs.

No references cited.